United States Patent Office 2,857,364
Patented Oct. 21, 1958

2,857,364

POLYMERIZATION OF CAPROLACTAM WITH AN ALKALI METAL ALKOXIDE CATALYST IN AN EXCESS OF ALCOHOL

George H. Berthold, Guilford, and Richard N. Lewis, North Haven, Conn., assignors to Olin Mathieson Chemical Corporation, a corporation of Virginia No Drawing. Application March 19, 1954
Serial No. 417,486

2 Claims. (Cl. 260—78)

This invention relates to polymerization of cyclic amides such as epsilon-caprolactam (E-caprolactam) and more particularly to a process of polymerization in which an alkali metal alkoxide (alkali metal alcoholate) is employed as a catalyst.

Processes proposed heretofore for the polymerization of such cyclic amides as E-caprolactam include the use as catalysts of organic and inorganic compounds, the alkali metals and the alkaline earth metals. These catalysts are required in relatively high proportions, up to about 5%, and the polymerization reaction requires a lengthy period of from several hours to several days, even at elevated temperatures of about 240° C.

In the present invention we employ an alkali metal alkoxide, preferably of a primary alcohol containing from four to six carbon atoms dissolved in an excess of the alcohol, for the polymerization of cyclic amides such, for example, as E-caprolactam, cyclohexanone isoxime, cyclooctanone isoxime, methyl cyclohexanone isoxime, and monomeric cyclic hexamethylene adipamide or mixtures of such cyclic amides. The alkali metal alkoxides are especially effective in the polymerization of E-caprolactam, and the detailed description which follows will be limited to the discussion of polymerization of that compound with these catalysts. Use of relatively small amounts of alkali metal alkoxides catalyzes the polymerization reaction so effectively that polymers of desirably low color and high quality are formed in a few minutes. These polymers are suitable for the uses in which polyamides are generally used, such as production of strong films and tough fibers.

An alkali metal (sodium, potassium or lithium) alkoxide employed in from .35 to 1.5 mole percent results in rapid polymerization of caprolactam at temperatures between 240° and 260° C. In a period varying from a few minutes to fifteen minutes a polymer is produced which is of low color, highly suitable for preparation of tough fibers which can be cold drawn, and for the production of strong film. One advantage of the use of the alkoxides is that they can be easily prepared. The alkali metal is added gradually to an excess of the alcohol while the latter is boiling under reflux. Boiling under reflux is continued until all of the alkali metal has reacted.

In a typical embodiment of the invention, the caprolactam to be polymerized was mixed with 1.4 mole percent of sodium isobutoxide to serve as a catalyst, the sodium isobutoxide being dissolved in four times its weight of isobutanol. The solution was heated in a suitable vessel immersed in a liquid heating bath and in an atmosphere of nitrogen, the nitrogen being bubbled through the molten mixture. The mixture reached a temperature of 250° C. after heating for about eighteen minutes. Polymerization of the caprolactam had started. After an additional period of three minutes and thirty-seven seconds, the temperature had risen to 257° C. Tough fibers, which could readily be cold drawn, were obtained by immersing a rod in the melt and withdrawing the same. The polymerization was stopped by chilling the vessel and its contents. The polymer solidified to a tough horny mass which was colorless, except for a slight tinge of tan.

The following table summarizes polymerization experiments with caprolactam using various sodium alcoholates. In every case, the product was a high polymer capable of being converted to strong film and fibers which could readily be cold drawn. The polymeric product in each case was only slightly colored a yellow or tan tinge.

| Catalyst | Mole Percent of Catalyst | Polymerization Temperature, °C. | Polymerization Time | |
|---|---|---|---|---|
| | | | Min. | Sec. |
| Sodium n-butoxide | 1.4 | 260 | 5 | 17 |
| Sodium isoamylate | 1.4 | 250 | 5 | 8 |
| Sodium cyclohexylate | 1.2 | 250 | 4 | 59 |
| Sodium isobutoxide | 1.2 | 225–230 | 9 | 17 |
| Sodium isopropoxide | 1.2 | 260 | 6 | |

In each case the alkoxide is dissolved in an excess of the alcohol, usually 3 to 5 times the weight of the alkoxide present. The presence of excess alcohol is desirable not only because it increases the convenience in handling but also because it enables the production of polymeric products having a desirably low color and in which the degree of polymerization is such that the product can readily be converted into valuable fibers or film. In the absence of excess alcohol the polymerization apparently occurs with uncontrollable rapidity leading to products of unduly high viscosity and generally of higher color.

Generally it is convenient to mix the catalyst with the caprolactam below the polymerization temperature. The mixture is then heated to bring about the polymerization. However, the process can also be effected by heating the caprolactam to polymerization temperature and then adding the catalytic mixture of alkoxide and excess alcohol.

While the specific examples herein disclosed are directed to polymers of E-caprolactam, other cyclic amides may be similarly polymerized, the procedure being substantially the same as set forth herein.

We claim:
1. The catalytic process of polymerizing caprolactam which consists of heating caprolactam to a temperature of 225° C. to 260° C. in the presence of 0.35 to 1.5 mole percent, based on the caprolactam, of an alkali metal alkoxide of an alcohol containing four to six carbon atoms, said alkoxide being dissolved in three to five times its weight of the said alcohol.
2. The catalytic process of polymerizing caprolactam which consists of heating caprolactam to a temperature of about 250° C. in the presence of 1.4 mole percent, based on the caprolactam, of sodium isobutoxide dissolved in four times its weight of isobutanol and maintaining said polymerization temperature for several minutes to not more than about fifteen minutes.

References Cited in the file of this patent
UNITED STATES PATENTS 2,749,331    Breslow _____ June 5, 1956

FOREIGN PATENTS 906,889    France _____ June 4, 1945

OTHER REFERENCES

Groggins: Unit Processes in Organic Synthesis, 4th ed., 1952, McGraw-Hill Book Co., Inc., New York, New York, pages 617, 828–829.